May 16, 1950     F. H. MITCHELL     2,508,183
GROOVING TOOL

Filed March 14, 1947

INVENTOR.
Francis H. Mitchell
BY
Busser and Harding
ATTORNEYS

Patented May 16, 1950

2,508,183

UNITED STATES PATENT OFFICE 2,508,183

GROOVING TOOL

Francis H. Mitchell, Philadelphia, Pa.

Application March 14, 1947, Serial No. 734,580

2 Claims. (Cl. 29—95)

My invention relates to that class of grooving tools that are especially designed to cut grooves in the periphery of an article having a circular contour. Such tools may form an element of a special groove-cutting machine or may be attached to a lathe, a boring tool machine or other convenient tool support, which, in the usual operation, while the article to be grooved rotates, holds the tool stationary except that it is slowly fed forward until the groove is cut to the desired depth.

Such grinding tools comprise a body and a head, the latter being, at its junction with the body, substantially narrower than the body and of gradually increasing width to its extremity, opposite outer corner edges of which form the cutting edges of the tool.

The width of the tool at its extremity determines the width of the groove to be cut and such grooves must often be cut to a precise width. In the grooving operation the cutting edges wear down more or less (although they may retain their cutting efficiency) and the width of the end of the tool head consequently decreases. After wearing reduces the width, even to the extent of one or two thousandths of an inch, the tool must be discarded or re-ground to adapt it to cut a narrower groove. In actual practice, since the necessity arises from time to time to cut grooves of many different widths, it is necessary to have on hand a great number of tools having cutting ends of many different widths.

The object of my invention is to provide a grooving tool whose cutting extremity is expansible or contractible in width and is thus adapted to cut grooves of different widths varying within a range that now requires having on hand quite a number of different grooving tools. The invention therefore has the double advantage of dispensing with the necessity of providing a number of special grooving tools adapted to cut grooves of widths varying within a considerable range and of prolonging the life of the tool in that it can be utilized for cutting grooves of uniform width for a much longer period of time than is possible with the conventional grooving tool.

A preferred embodiment of the invention is shown in the accompanying drawings, in which—

Figure 1:
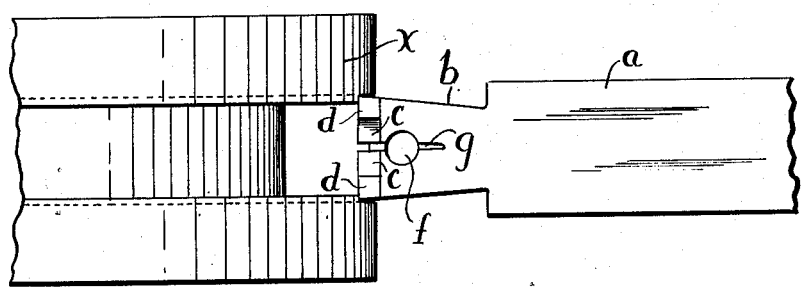
Fig. 1 is a plan view of part of the grooving tool in operative relation with the article to be grooved, the tool being shown as operating to widen the groove of an article already grooved to a narrower width.
Figure 1:
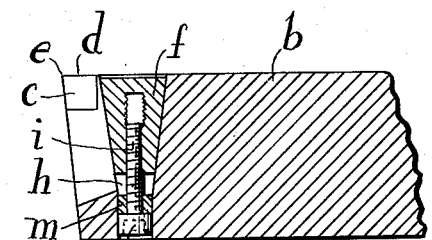
Figure 3:
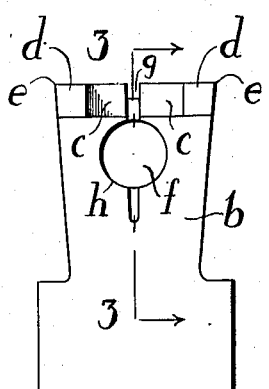
Fig. 3 is a section on the line 3—3 of Fig. 2.
Figure 4:
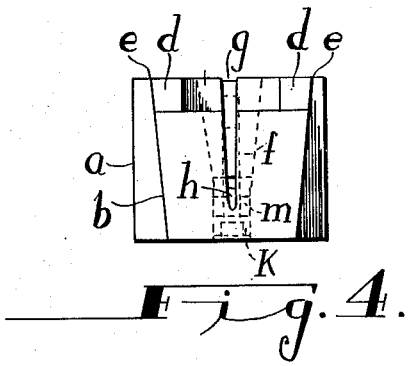
Fig. 4 is a front view of the tool.
Figure 2:
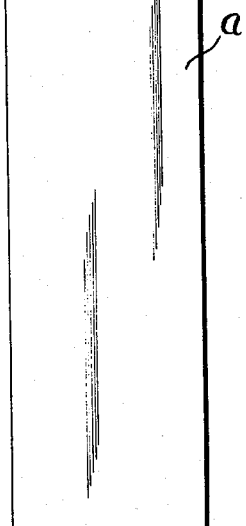
Fig. 2 is a plan view of the grooving tool.

The body $a$ of the groove has a head $b$ the end of which is recessed at $c$, forming spaced apart cutting blades $d$ the outer corner edges $e$ of which are the cutting edges. The cutting head $b$, or at least the cutting blades $d$, should be made of one of the known alloy steel compositions that is especially adapted for use in the manufacture of cutting tools. In the growing operation the article $x$ to be grooved is rotated, the tool $a$—$b$ being held fixed except for a gradual forward feeding movement that continues until the article is grooved to its desired depth.

The head $b$ of the tool is split through its center to form a narrow deep groove $g$ that divides the head into two wings, each carrying one of the cutting blades, integrally united near the base of the head and capable under adequate force of being spread apart.

Extending through the head and intersecting the groove $g$ is a hole $h$ which is of frusto-conical shape except that, preferably, the end thereof adjacent the narrower end of the frusto-conical part is circular. Within the frusto-conical part of the hole is a plug $f$ of frusto-conical contour. Threaded in the plug is a screw $i$ having a head $k$ adjacent a web $m$ extending across the hole $h$.

By applying an appropriate tool to the head of the screw and turning the same the plug $f$ will be moved in one direction or the other to either expand the wings of the head $b$ or allow them to move toward one another, thereby widening or narrowing the grooving head to adapt it to cut grooves of different widths.

When the tool is first put into use, the wings of the head are usually at their closest approach and are adapted to cut a groove of a certain predetermined width. After a certain period of use the cutting edges $e$ become worn (but without impairing their cutting efficiency) so that the width of the head is reduced below the tolerance allowed for the width of the grooves in the article to be grooved. Thereupon the screw $i$ is turned to move the expansion plug $f$ in the direction required to spread the wings of the head $b$ until the head is restored to its original width. When the cutting edges become dulled, the worn edge may be readily restored by regrinding to reduce its width only about .001 inch. The cutting edge may then be expanded, as described, to restore it to its original width.

It will thus be clear that the life of the tool may be much prolonged and retain its capacity for cutting grooves of predetermined width.

The tool has an additional pronounced advantage. The tolerance allowed for grooves to be cut rarely exceeds one or two thousandths of an inch. Yet it may be desired to cut a number of grooves having various widths within the range of (say) .050 inch. For this purpose it has been customary to keep on hand a number of grooving tools having cutting heads of corresponding width. The head of my improved tool may be expanded or contracted to cut grooves of varying width within approximately this range; for example, grooves varying in width from 1.251" to 1.300" may be cut by means of the same tool, thereby, as above stated, dispensing with the need of carrying in stock a considerable number of grooving tools.

What I claim and desire to protect by Letters Patent is:

1. An expansion grooving tool comprising a body and a cutting head which at its outer end is recessed and the outer corner edges of which form cutting edges, the cutting head being split down its center and thus divided into two wings having opposing flat faces and integrally united at their bases, the head having a transversely extending hole intersecting said split and thereby formed partly in one wing and partly in the other, the axis of the hole extending through the space between said opposing flat faces of the wings, the hole being a frusto-conical contour, a plug of similar contour located in the hole and a rod threaded in the plug and turnable to move the plug along the hole to thereby spread said wings.

2. An expansion grooving tool as defined in claim 1 in which the rod is a screw and in which the narrower end of the hole is of circular contour and within which the head of the screw has a neat fit and is turnable.

FRANCIS H. MITCHELL.

REFERENCES CITED

The following references are of record in the file of this patent:

UNITED STATES PATENTS

| Number | Name | Date |
| --- | --- | --- |
| 225,265 | Arntz | Mar. 9, 1880 |
| 270,554 | Pelton | Jan. 9, 1883 |
| 2,355,965 | Frishette | Aug. 15, 1944 |